United States Patent [19]
Trakas

[11] Patent Number: 5,147,663
[45] Date of Patent: Sep. 15, 1992

[54] MODULAR MANIFOLD ASSEMBLY

[76] Inventor: Panos Trakas, 1820 Amelia La., Addison, Ill. 60101

[21] Appl. No.: 595,180

[22] Filed: Oct. 9, 1990

[51] Int. Cl.⁵ .............................................. B29C 45/22
[52] U.S. Cl. .................... 425/549; 264/328.8; 264/328.15; 425/567; 425/570; 425/572
[58] Field of Search ............... 425/547, 549, 567, 568, 425/569, 570, 571, 572; 264/328.8, 328.14, 328.15, 328.16

[56] References Cited

U.S. PATENT DOCUMENTS

| | | | |
|---|---|---|---|
| 4,433,969 | 2/1984 | Gellert | 425/549 |
| 4,492,556 | 1/1985 | Crandell | 425/549 |
| 4,882,469 | 11/1989 | Trakas | 425/549 |
| 4,902,219 | 2/1990 | Leverenz | 425/549 |
| 5,032,078 | 7/1991 | Benenati | 264/328.8 |

FOREIGN PATENT DOCUMENTS 143922  7/1985  Japan ................................. 425/547

OTHER PUBLICATIONS

National/Rama True Shot Runnerless Injection Molding System Catalog and Price List Oct., 1989.

*Primary Examiner*—Tim Heitbrink
*Attorney, Agent, or Firm*—Lockwood, Alex, FitzGibbon & Cummings

[57] ABSTRACT

A modular manifold system is described. A plurality of generally cylindrical manifold components engage a melt distribution element. The manifold components each have a generally cylindrical body which has an annular cavity formed therein which axially extends with the component body for a predetermined length which separates the component body from a component inner core. A melt runner passage extends axially through the inner core. A heating element in the form of a ceramic insulator sleeve occupies a portion of the annular cavity with a particulate refractory material occupying the remainder of the annular cavity.

40 Claims, 6 Drawing Sheets

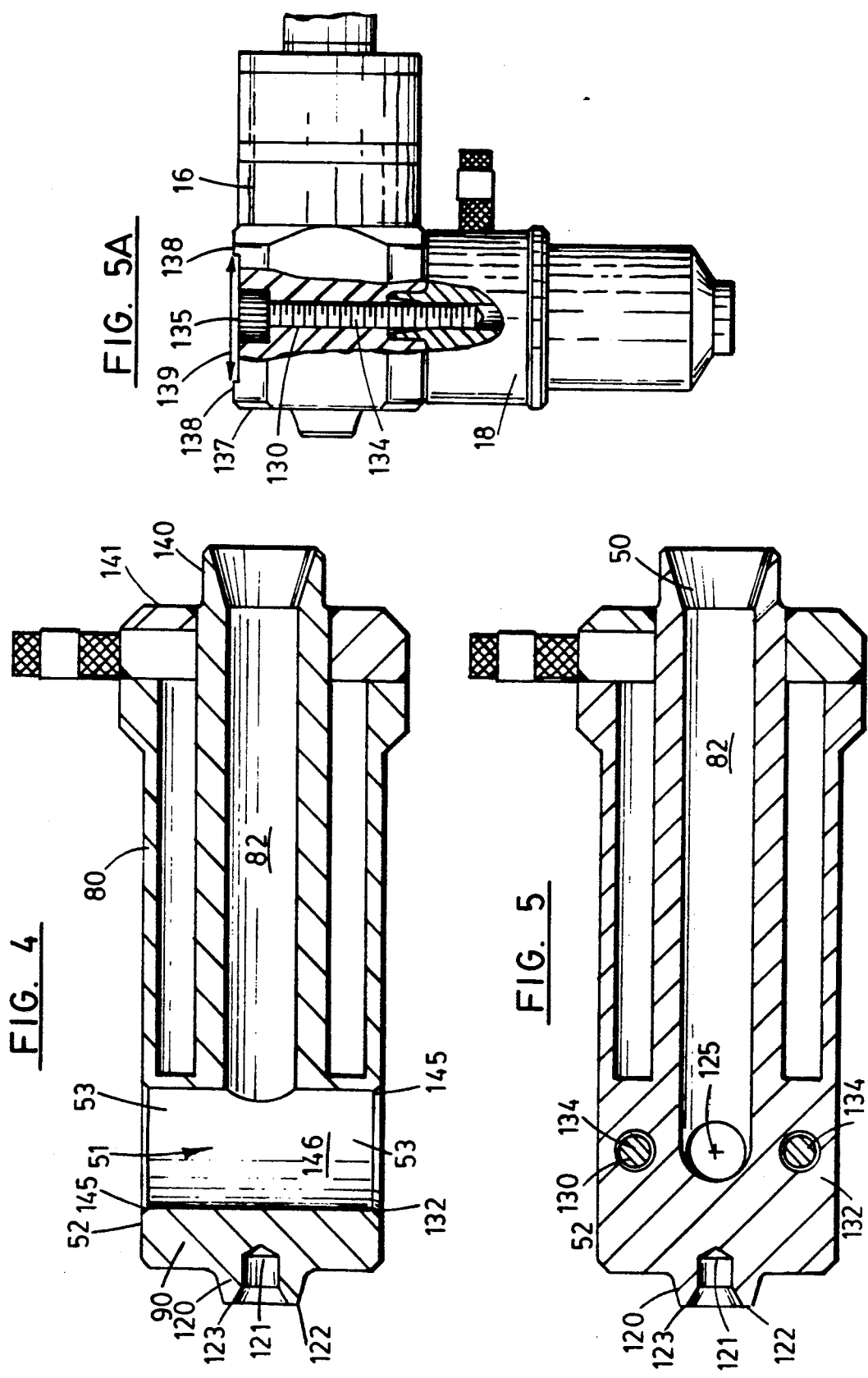

MODULAR MANIFOLD ASSEMBLY

BACKGROUND AND SUMMARY OF THE PRESENT INVENTION

The present invention relates generally to injection molding systems and, more particularly, to an injection molding modular manifold system having a plurality of internally heated components which can be assembled together in an interconnected fashion to form a heated melt distribution passage which leads from an injection molding machine nozzle to any number of mold cavity gates.

Injection molding is commonly used to produce a number of plastic items. It is beneficial to the molding manufacturer to produce multiple products with every "shot", or cycle, of the injection molding machine, rather than molding one individual product per molding cycle. When multiple parts are molded in each cycle, such parts are commonly interconnected by solidified plastic and form a "runner" which interconnects the multiple parts. The individual parts must then be trimmed from their runners which requires additional labor and creates material waste. Runnerless injection molding is used to eliminate the necessity of trimming the plastic runner before subsequent further assembly or packaging of the products.

In order to take advantage of the efficiency of runnerless injection molding, it is required that the melt pathway between the injection molding machine and the mold cavity gates positioned in the mold block or blocks be heated. To achieve the desired heating of substantially the entire melt pathway, a variety of individually heated members such as sprue bushings, torpedoes and/or cartridge heaters have been developed. Using heated members requires either that the heated members themselves be arranged in such a manner to form a substantially continuous heated flowpath from the injection entry point to each mold cavity gate or requires the heated manifold be present to provide a heated melt pathway for the injected melt leading from the injection molding machine nozzle to the various secondary heated members and/or to the mold block cavity gates.

Typically, these manifolds have taken the form of relatively large elongated heated plates, such as is described in U.S. Pat. No. 4,761,343, in which a plurality of secondary heating elements are disposed in respective mold cavity gate passageways and which are interconnected to an injection molding machine heated nozzles by means of a series of elongated plates. These elongated plates take up much room within the mold blocks and require a complex heating element insert system. Additionally, plate-type manifolds are, because of their mass, require more energy to heat up the plate and are further subject to greater thermal expansion than the secondary heated members which they engage, thereby necessitating modification of both the secondary heated members and the manifold plates to take into account the forces encountered in such expansion. This problem is aptly described in U.S. Pat. No. 4,433,969. Moreover, such plate-type manifolds are relatively large and virtually require a uniquely designed manifold plate for every molding layout, thereby necessitating that the molding manufacturer maintain a large inventory of manifold plates.

Thus, a need in the art exists for a modular injection molding manifold system. Some manifold systems are modular in nature and alleviate some of the above-referenced disadvantages. An example of such a manifold system is the True Shot® runnerless injection molding system described in the National/Rama Corporation Brochure dated October, 1989. Although the system shown therein describes a plurality of interconnecting components, the interconnecting manifold components are externally heated by numerous external band heaters. The use of external band heaters has certain disadvantages. The outer surfaces of the band heaters are exposed to the air, and thus not all of the heat provided by the band heater is applied to the manifold component it encircles, because some of the heat escapes, by radiation, to the air and the mold plates surrounding the component. This heat loss raises the power requirement necessary to maintain the manifold system at the desired temperature. Moreover, external band heaters are limited in their length and thus do not evenly heat the entire length of the manifold component to which the band heater is applied. Furthermore, because the band heaters are applied to the outer surface of the manifold components, they are subject to thermal expansion when energized, which may result in the band heater "growing" away from the manifold component it is applied to. Consequently, the band heaters cannot be adjusted after they are energized to correct this growth. Thus, it is evident that band heaters do not provide an even heat distribution to a series of interconnected manifold components.

Accordingly, there remains a need in the art for an injection molding manifold system which is internally heated and which is modular in nature such that substantially all of the modular interconnecting manifolds are internally heated.

The present invention is directed to a modular manifold system for use in injection molding which overcomes the aforementioned disadvantages. In this regard the present invention provides a modular manifold system which includes a plurality of internally heated interconnecting components which form a continuous, heated flowpath which leads from the injection molding machine nozzle or bushing, to a plurality of secondary heated members disposed in various mold block openings which lead to the respective mold cavity gate of the molding system.

Each component of the modular manifold system is internally heated by an electrical heating element in the form of a ceramic sleeve which may be disposed in an annular cavity encircling the internal passageway. Each manifold component has an integral construction, meaning that its outer wall, endwall and inner melt passageway sidewall are all formed from a single piece of material providing the manifold component with an integral casing or housing in which no joints, welded or otherwise, are present along the melt flowpath thereby reducing the likelihood of heater failure due to melt infiltration into the internal heating element. Some portions of the manifold component body extend outwardly to contact the mold block surfaces to provide an air gap between the manifold component and the mold block to thereby minimize the amount of heat transferred to the surrounding mold block. Other portions of the manifold component body extend outwardly to provide support surfaces which assist the manifold component in resisting the forces applied thereto by the pressure of the injected melt and hold the manifold component in place.

Accordingly, it is a general object of the present invention to provide a modular manifold system for use in injection molding having a plurality of interconnecting, internally heated manifold components.

Another object of the present invention is to provide a modular manifold system for injection molding having a plurality of internally heated manifold components which, when assembled together, form a heated passageway between a primary heated member and one or more secondary heated members and wherein each manifold component includes an axially extending annular compartment containing a heating element assembly in the form of a sleeve wherein the heating element assembly is disposed within the manifold component in a heat transfer relationship to the internal melt passageway.

A further object of the present invention is to provide a modular injection molding manifold system having a plurality of interconnecting, internally heated manifold modules wherein each of the manifold components has an internally heated inner melt passageway extending through an elongated inner core and wherein each module is substantially of one-piece construction wherein the manifold component outer wall, endwall and melt passageway inner core wall are formed from one piece of material.

It is still another object of the present invention to provide a modular injection molding manifold system having a plurality of internally heated, interconnecting manifold components, which can be interconnected to one another to form a variety of injection molding manifold configurations and which can also be easily disassembled to allow both quick and reliable assembly and disassembly of the manifold system.

It is yet still a further object of the present invention to provide a modular manifold system for injection molding having a plurality of internally heated manifold components wherein each manifold component includes its own temperature sensing and controlling means, thereby allowing the user to monitor and control the temperature of the manifold system from the primary heated member to the secondary heater members.

Yet another object of the present invention is to provide a balanced linear modular manifold system for use in a mold block system with multiple "drops", the system having a plurality of interconnecting, internally heated manifold components wherein the linear distance between the melt distribution element and each "drop" is the same, thereby providing a similar flow distance between the system inlet and all the system "drops" to maintain a uniform pressure drop throughout the manifold system.

Yet still another object of the present invention is to provide an injection molding balanced modular manifold system having a plurality of interconnecting, internally heated manifold components in which the thermal expansion of the manifold components is directed toward the center of the manifold system.

These and other objects, features and advantages of the present invention will be apparent from the following detailed description taken in conjunction with the accompanying drawings wherein like reference numerals refer to like parts.

BRIEF DESCRIPTION OF THE DRAWINGS

In the course of this description, reference will be made to the attached drawings in which:

FIG. 4 is a sectional view of a manifold component having a double outlet end;

FIG. 5 is a sectional view of a manifold component having an angled internal melt passageway;

FIG. 5A is a cutaway elevational view of two assembled manifold components showing the extent of the assembling screw cavity;

DETAILED DESCRIPTION OF THE PREFERRED EMBODIMENTS

Figure 1:
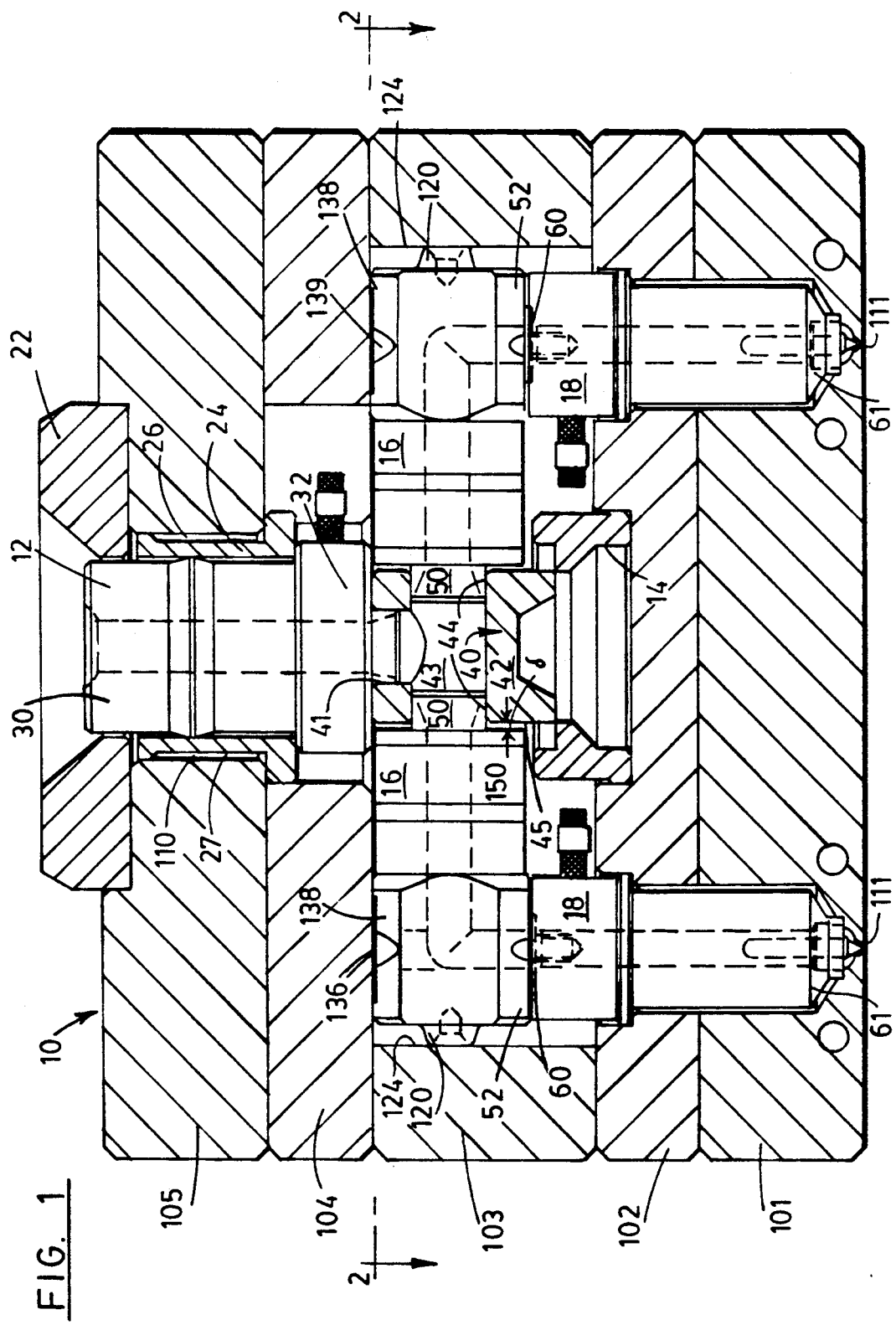
FIG. 1 is an elevational view of a modular manifold system for injection molding constructed in accordance with the principles of the present invention and shown in place within a mold block system.

Referring to the drawings, and in particular to FIGS. 1-8, a modular manifold system 10, constructed in accordance with the principles of the present invention is shown in place within a plurality of mold plates 101-105. The manifold system includes a primary heated inlet member 12, a distribution assembly 14 supported on a surface of one of the mold plates 102 and a plurality of interconnecting manifold components 16. The manifold components extend outwardly from the distribution assembly 14 and engage respective secondary heated members 18 at their outlet ends 52. The primary heated member 12 may be held in place within the upper mold cavity plates 104 and 105 by means of a spacing ring 24, which centers the primary heated member 12 within the opening 110 of the initial mold cavity plate 105. This spacing ring 24 also effectively provides an air gap 26 around the primary heated member 12 by way of an annular channel 27 which extends around the periphery of the ring spacing component 24. An injection molding locating ring 22 which encircles the inlet end 30 of the primary heated member 12 may also be used to guide the injection molding machine nozzle or bushing (not shown) into proper alignment with the primary heated member inlet 30.

The primary heated member outlet end 32 is received by the primary opening 41 of distribution element 42 of a manifold distribution assembly 40. The distribution element primary opening 41 opens into an internal melt passageway 43 which leads to one or more secondary openings 44 of the distribution element which are adapted to snugly engage the inlet ends 50 of the interconnecting manifold components 16 in a sliding relationship as will be explained below.

The outlet ends 52 of the interconnecting manifold components are similarly adapted to engage respective inlet ends 60 of the secondary heated members 18 shown as sprue bushings which members correspond to the number of "drops" in the system and which extend the heated melt flowpath to the mold cavity gates 11.

Figure 3:
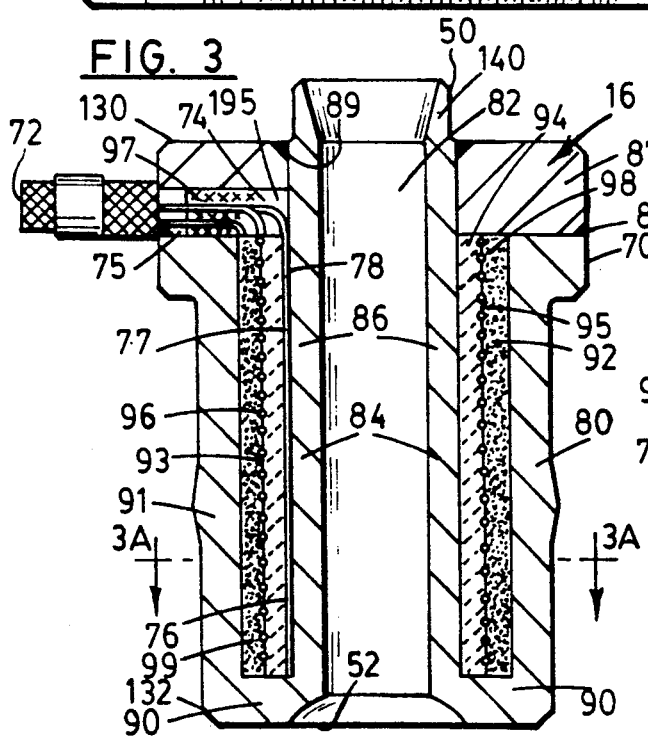
FIG. 3 is a sectional view of a completed interconnecting manifold component.

Turning now to the unique construction of the individual manifold components or modules 16 which constitute the modular manifold system, and with specific reference to FIG. 3, each manifold component or module 16 of the system 10 has an elongated body 80 with an enlarged end portion 70 which houses a shielded electrical cable 72 located in a connection cavity 74 which extends outwardly by way of a channel 75 therein from the enlarged end portion 70. The cable 72 contains the necessary electrical wires which lead to an external source of power (not shown) which monitors the temperature of the bushing.

Figure 3A:
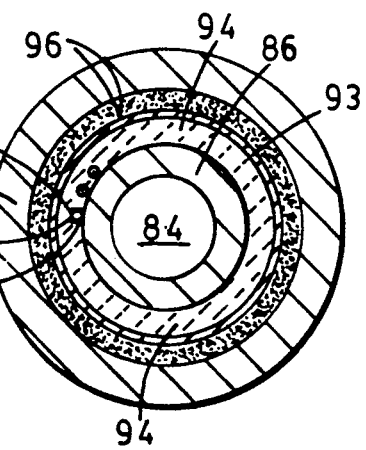
FIG. 3A is a cross-sectional view of the manifold component of FIG. 3 taken along line A—A.

In accordance with an important aspect of the present invention and as best shown in FIGS. 3 and 3A, each manifold component has an integrally formed body 80 such that the manifold component outer casing or sidewall 91 is integral with the manifold elongated inner core 84. As used in the present invention and in this accompanying detailed description, "integral" refers specifically to the manifold component body construction, i.e., that the inner core wall 86, the manifold component endwall 90 and the manifold component sidewall 91 are integrally formed from a single piece of metal such that there are no joints welded or otherwise disposed along the inner core 84 and the melt runner passage 82. With no joints disposed along the melt passageway 82 in the melt flowpath, the likelihood of burnout of the heating element due to infiltration of injected melt is virtually eliminated.

In this regard, the manifold component body 80 has an internal melt runner passage 82 which axially extends through and is centrally disposed in the elongated inner core 84 defined by the surrounding inner core wall 86. The inner core 84 and its respective inner core wall 86 extend radially outwardly at one end thereof, as one piece, to form a manifold component endwall 90. An outermost portion of the endwall 90 extends axially rearwardly and generally parallel to the inner core 84 so as to form a manifold component sidewall 91 to define an elongated general annular compartment 92 therebetween. The annular compartment 92 may be formed in a metal blank (not shown) having a preselected uniform diameter by any suitable means such as by machining, casting or electric discharge machining ("EDM").

The annular compartment 92 separates the inner core 84 from the component casing or outer sidewall 91. The annular compartment 92 is preferably dimensioned in width to loosely receive a heating means in the form of a preformed hollow non-electrically conductive, ceramic insulator sleeve 94 wound on its exterior surface 95 with a resistance wire 96 to form a heating coil 93 extending along substantially the entire axial length of the sleeve 94. The hollow sleeve 94 encircles the manifold component inner core 84 so that the resistance wire 96, when energized by a remote power source, provides effective heating of the component inner core 84 and the melt runner passage 82 extending between the opposing inlet and outlet ends of the component 16.

The inner diameter of each preformed heating element sleeve 94 is preferably slightly greater than the outer diameter of the inner core wall 86, while the sleeve outer diameter is substantially less than the inner diameter of the annular compartment 92. The clearance between the outer surface of the preformed sleeve 94 and the inner surface of the manifold component outer sidewall 91 forms another annular space 98 which surrounds the outer diameter of the preformed sleeve 94. A particulate ceramic refractory material 99, such as powdered magnesium oxide, which facilitates the transfer of heat between the heating coil 93 and the inner core 84 and further insulates the heating coil 93 from contact with the metal manifold component inner core 84 and outer sidewall 91 is deposited into the annular space 98 to form a manifold component-heater assembly.

Magnesium oxide is a particularly suitable ceramic refractory material since, when fully compacted, it has excellent high transfer capabilities and good dielectric strength at high temperatures. The powder refractory is preferably finely ground so that it completely fills most of the initial air voids caused by pouring the refractory material into the annular space 98. Any remaining air voids in the refractory material are removed when the manifold component-heating assembly is swaged down to a second preselected diameter as is explained below.

After the manifold component annular compartment 92 has been filled with the preformed sleeve 94 and the powdered refractory material 99, the entire filled component-heater assembly is then swaged in a conventional manner to compress the refractory material 99 around the heating element sleeve 94 to form a unified mass in the annular compartment 92. The swaging also reduces the component heater assembly to a second, uniform preselected diameter. The pressure exerted on such component or module assembly during swaging, forces the powdered refractory 99 into the annular space 98 surrounding the preformed ceramic insulator sleeve 94, eliminates any air voids in the refractory material 99 and maintains a spacing between adjacent resistance wires 96. This compaction further ensures that the resistance wires 96 are maintained in their position as wound on the preformed sleeve 94. Finally, the swaging also compacts the magnesium oxide refractory material 99 to a preferred density which is desired for excellent heat transfer. Due to manufacturing tolerances, an occasional small gap may appear between the inner diameter of the heating element sleeve 94 and the outer diameter of the manifold component inner core 84. This gap is also filled with the powdered refractory material 99 during the swaging process.

The preformed sleeve 94 may also contain one or more axially extending slots 76 which are located in the inner wall thereof and disposed such that they are adjacent the component inner core 84 when the preformed sleeve 94 is placed over the inner core 84. The slots 76 receive a preselected length of a hollow thermowell 77, which accommodates a thermocouple lead 78. The thermocouple lead 78 extends for substantially the entire length of the thermowell 77 as well as substantially the entire length of the preformed sleeve 94. This thermocouple 78 allows the user to easily and reliably monitor the heat applied to each manifold component inner core 84. The thermowell 77 becomes firmly embedded in the annular compartment 92 as a result of the swaging process, and thus, if the thermocouple 78 should fail in operation, it can be easily removed and replaced at the component enlarged end portion 70 and thus, the component need not be discarded.

After swaging, any open area A5 remaining above the end of the preformed sleeve 94 in the component enlarged end portion 70, may be filled with any suitable heat-resistant material such as epoxy cement or a ceramic cement to form a component heater assembly plug 97. The component 16 is then completed by sealing off the annular compartment 92 at the component enlarged end portion 70. This is preferably accomplished by welding an end portion 70 washer 87 to both the enlarged end and the inner core wall 86 by welds 89. The inner core wall 86 may then be finished to produce the desired inlet end 50 for the component 16.

Figure 8:
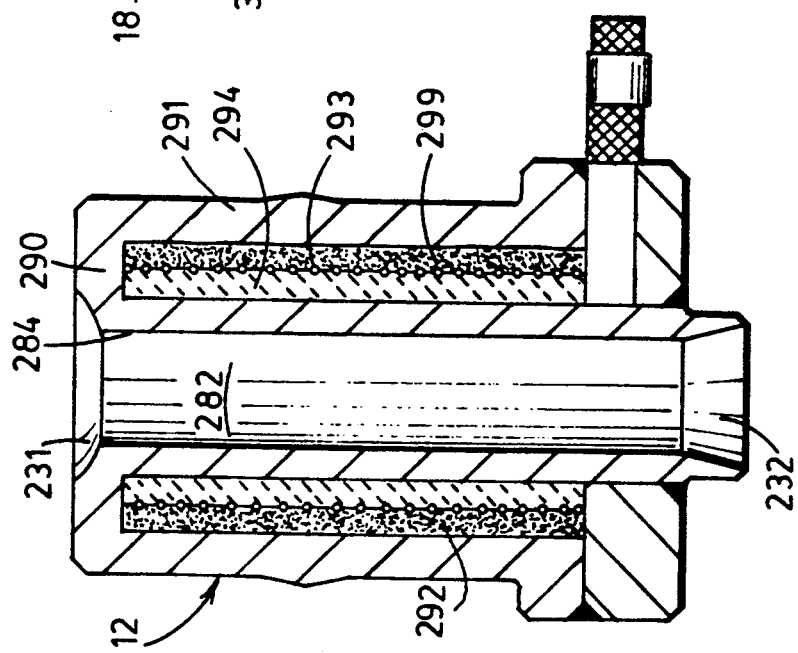
FIG. 8 is a sectional view of a primary heated member used in the modular manifold system of FIG. 1.

The primary heated member 12 used with the manifold system 10 is also preferably internally heated and of the same integral construction as the manifold components. As shown in FIG. 8, the primary heated member or sprue bushing 12 has an inner core 284 which defines the central melt runner passage 282 extending between the opposing inlet and outlet ends thereof, 231, 232, respectively. An extension of the inner core 284 serves as the bushing end wall 290 which extends radially outwardly and then rearwardly to define the bushing casing or sidewall 291. An annular compartment 292 located between the bushing sidewall 291 and the inner core 284 contains a heater assembly similar to that described above such as a ceramic insulating sleeve 294, a resistance wire heater 293 and a unified mass of insulative ceramic material 299.

Figure 10:
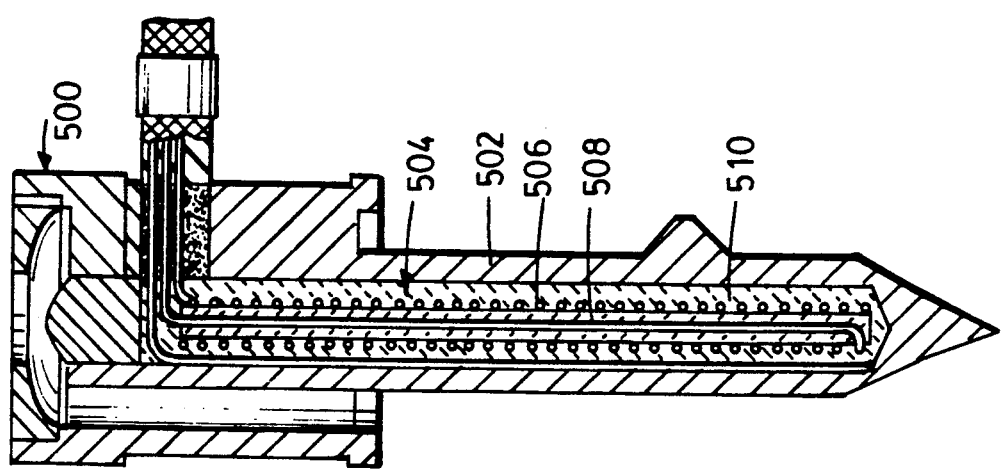
FIG. 10 is a sectional view of another secondary heated member for use in the modular manifold system of the present invention.
Figure 9:
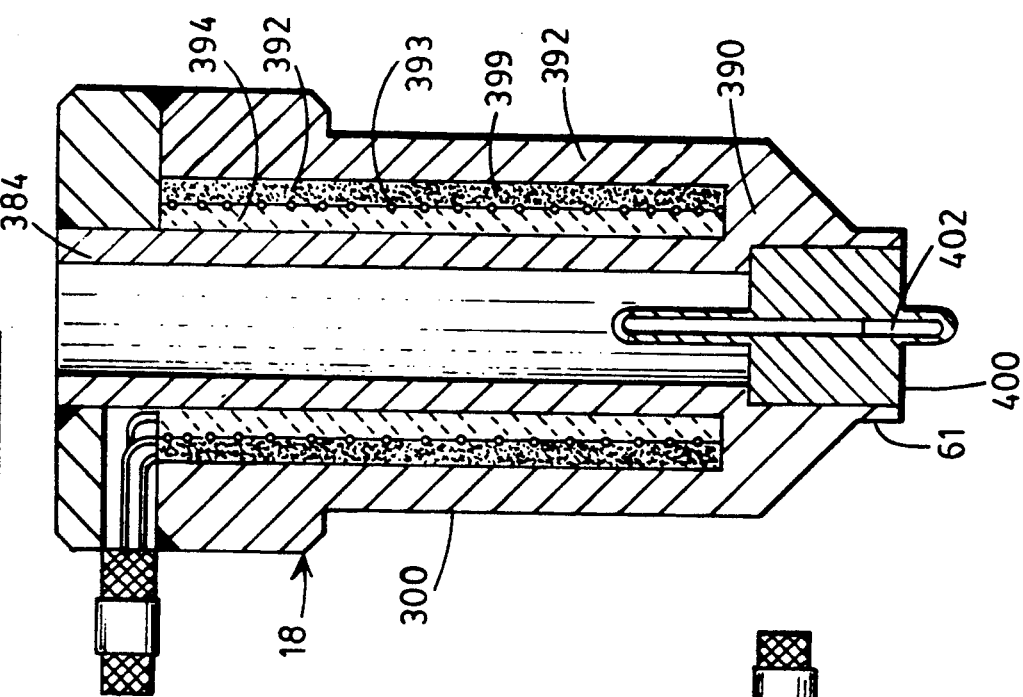
FIG. 9 is a sectional view of a secondary heated member used in the modular manifold system of FIG. 1.

Likewise, the secondary heated members 18 are preferably internally heated and of an integral style construction such as is shown in FIG. 9 wherein a sprue bushing 300 has an internal ceramic sleeve 394 contained in an annular compartment 392 defined among the bushing inner core 384, the bushing sidewall 392 and the bushing end wall 390. The ceramic sleeve 394 has a heating element 393 wound around its exterior which is held in place by an outer annular deposit of particularized ceramic material 399. The secondary members may also contain, in the outlet ends 61 thereof, displaceable gating needles 400 of the type described in my copending application Ser. No. 588,172, filed Sep. 26, 1990, now U.S. Pat. No. 5,098,280 which gating needles contain an internal heat transfer means, such as a heat pipe 402. Alternatively, the secondary heated members 18 may also include torpedoes (FIG. 10) rather than sprue bushings wherein the torpedo 500 has an integral outer casing 502 which is filled with an electric heater assembly 504 using a resistance wire 506 wound around a ceramic core 508 and embedded therein with particularized ceramic 510 such as by swaging.

In another important aspect of the present invention as shown in FIGS. 4, 5 and 5A, the manifold component or module endwall 90 may be specially configured at one or more ends thereof to provide a plurality of lands or raised portions or "standoffs" which extend outwardly from the module body 80. The raised portions 120 abuttingly engage an opposing surface 124 of the mold blocks 103 (FIG. 1) and resist the pressure imparted to the component 16 along the axis or inner core 84 of the component 16 caused by the injected melt so that the component outlet end 52 is always aligned with and properly mated to the secondary heated member 18 it engages. Without the raised portions 120, the injection pressure would most likely force the manifold component outlet 52 out of alignment with the secondary heated member inlet 60 and cause the injected melt to leak from the manifold system 10 and fill the space surrounding the system rather than the mold cavity. Because the raised portions 120 will contact the mold block surfaces 124 during operation of the system, they are preferably provided with a recess 121 which defines a raised or standoff rim 122 having a generally annular support surface 123 which provides the necessary surface area to resist the injection pressure discussed above, yet presents a minimal surface contact with the mold blocks to thereby minimize any transfer of heat between the component 16 and its abutting mold blocks 103.

While the component or module 16 is one which will be directly connected to a secondary heated member 18, the module may also be provided with connecting means, shown in FIGS. 1, 5 and 5A as one or more screw cavities 130. The cavities 130 are disposed in the solid portion 132 of the module endwall 90 and extend therethrough. The screw cavities 130 permit the modules 16 and adjoining secondary heated members 18 to be firmly attached together in a melt flow relationship throughout the injection process. The screw cavities 130 may be counterbored so that the module attachment screw 134 and the screw heads 135 are recessed within the module solid end portion 132 so that they do not contact the mold block opposing surfaces 136. Additionally, the outer, upper surface 137 of the module solid end portion 132 may be provided with outwardly extending lands 138 which assist in positioning the module in place within the mold blocks and which also create an air gap 139 between the solid end portion 132 of the module 16 and the mold block 104 overlying the module.

Because each individual manifold component 16 is integral in nature, the respective inlet and outlet ends 50 and 52 thereof may be provided with engagement means as set forth more fully below which permit the manifold components 16 to be easily interconnected and disassembled to create a variety of manifold layouts, thereby giving the present invention a modular nature.

After swaging, the enlarged end portion 70 of the module 16 can be further machined to provide an axially extending neck portion 140 at the manifold component inlet 50 which extends a preselected distance past an end surface 141 on the module 16 such that the neck portion 140 can be slidingly received into either an opening in the distribution assembly element 41 or into the outlet end of an adjoining manifold module.

As previously explained above, and as shown in FIGS. 4 and 5, the opposite or outlet end 52 of the manifold component 16 may be provided with a preselected axial extending solid end portion 132 of the module endwall 90 which permits the outlet end 52 to be specially configured to provide the desired outlet end for the manifold module. For example, as shown in FIG. 5 the component outlet end 52 may be most commonly provided with an angled outlet or melt flowpath 125, wherein the internal melt runner passage 82 exits the module generally at a right angle from its inlet end 50. Similarly, the module solid end portion 132 may have a double or "Tee" outlet end 51 as shown in FIG. 4 wherein the internal melt passage 82 exits the module at two locations 53 on the exterior surface thereof. The solid end portion 132 may also be large enough to permit particular finishing of the double outlet portions thereof 53 which are shown as each having an angled inner surface 145 opening onto a central passage 146 into which the module melt runner passage 82 opens. Thus, the present invention allows the user to create an unlimited number of manifold layouts, thereby giving the present invention a modular nature.

Figure 2:
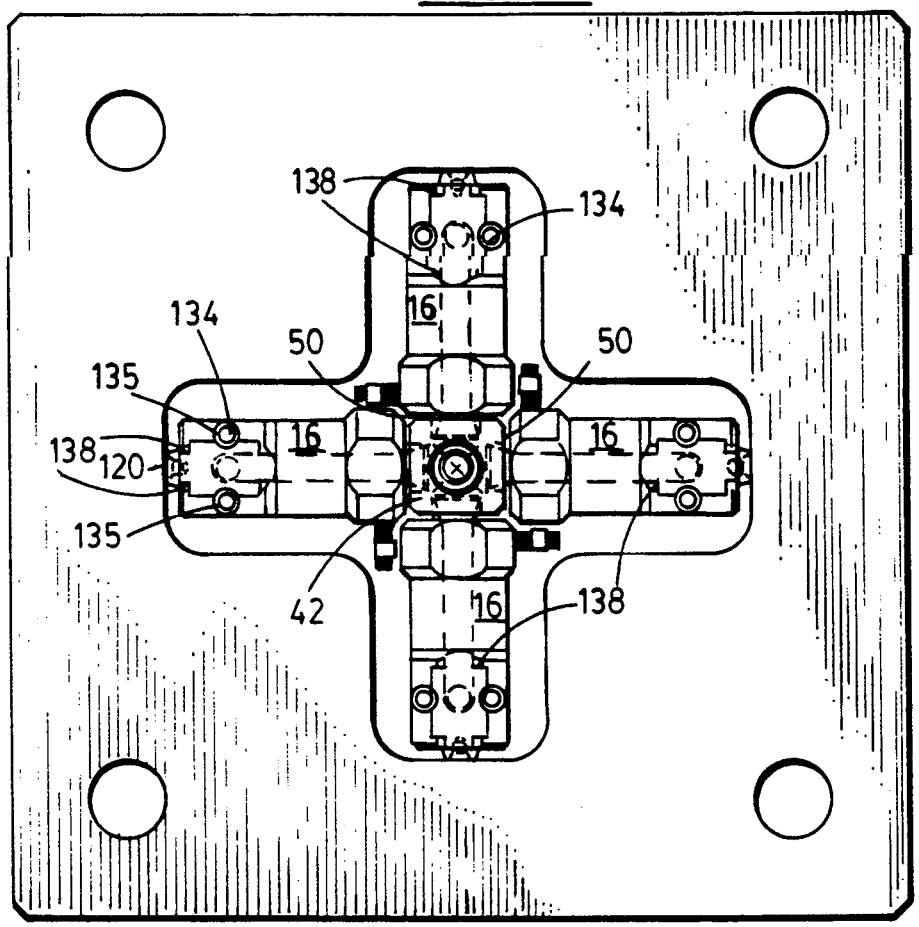
FIG. 2 is a plan view of the modular manifold system shown in FIG. 1 taken along line 2—2.

In this manner the modules can be assembled to form a virtually unlimited number of internally heated manifold system configurations. Specifically, as shown in FIG. 2, four manifold components 16 may be used in combination with a four-way distribution element 42 to provide a heated melt flowpath which supplies four mold cavities or "drops". In this embodiment, the manifold components 16 engage the distribution element 42 at their inlet ends 50 and are connected to four secondary heated members 18 by means of attachment screws 134 which extend downwardly through the screw cavities 130 which flank the respective melt outlet 52 ends thereof.

Figure 6:
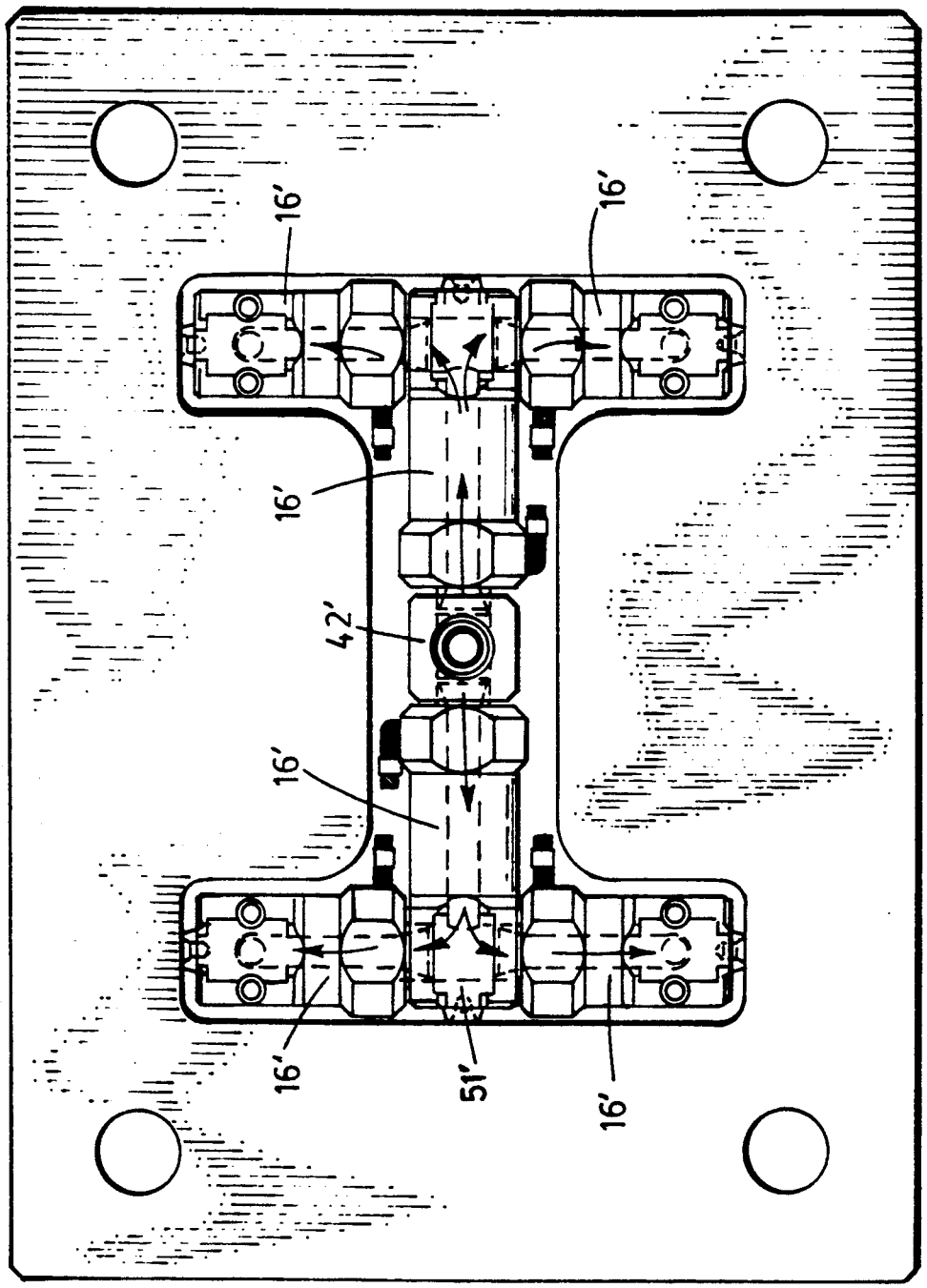
FIG. 6 is a plan view of an injection molding modular manifold system supplying four mold cavity gates or "drops" arranged in a "H" configuration.
Figure 7:
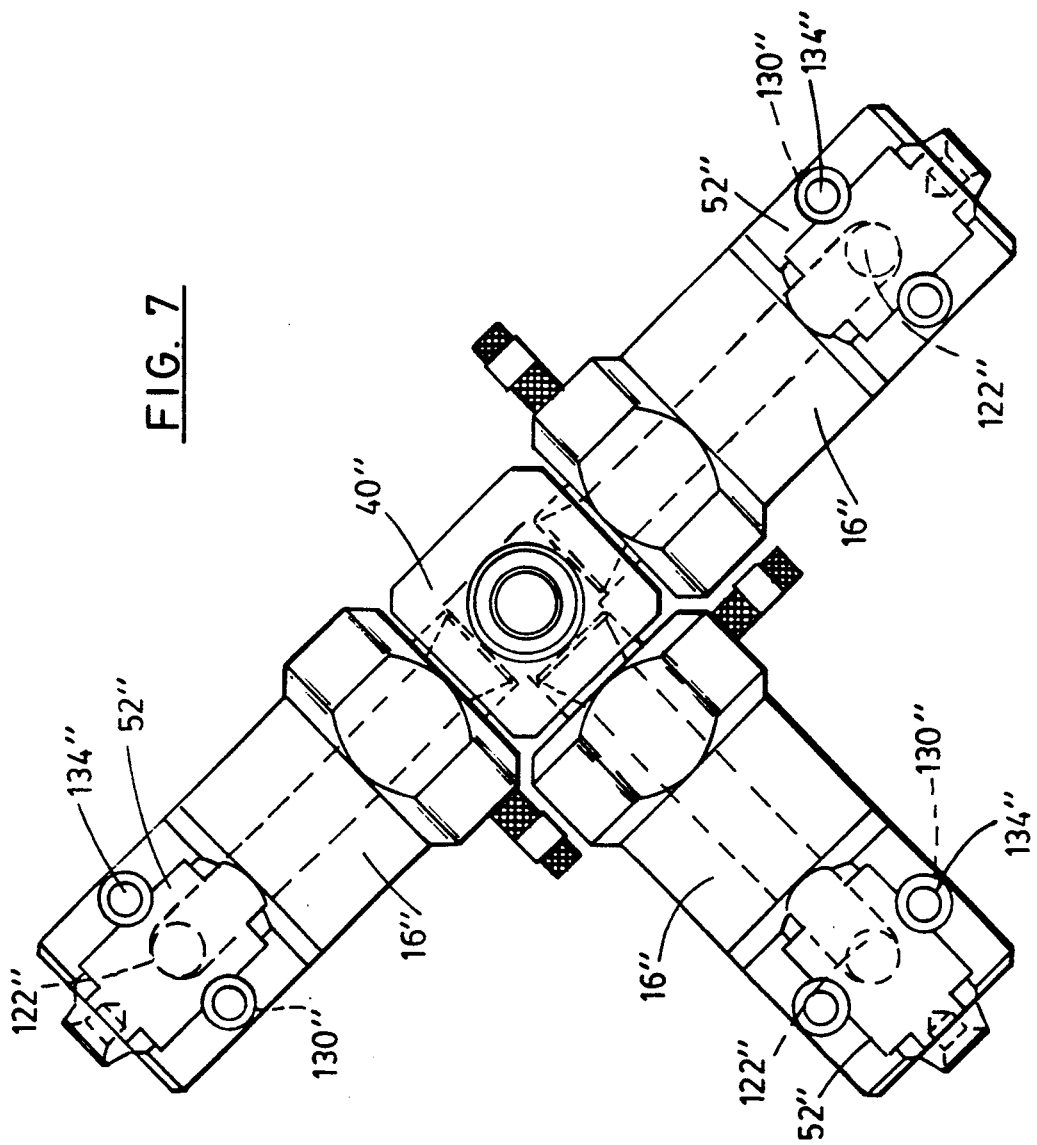
FIG. 7 is a plan view of an injection molding modular manifold system supplying three mold cavity gates or drops arranged in a "T" configuration.

Similarly, as shown in the embodiments illustrated in FIGS. 6 and 7, an injection molding manifold system of the present invention can easily be assembled to supply three or four mold cavities in either a "T" configuration or a "H" configuration. Six manifold components 16' are used in the former embodiment to provide a heated melt flowpath (shown by the arrows) from between the distribution element 42' to the four secondary heated members disposed beneath the outermost manifold components 16' located at the opposing sides of the "Tee" melt outlet 51' of the inner modules. Unique to this particular embodiment is the outlet end configuration of the two innermost or initial manifold components which have a "Tee"-style outlet end 51', which, as discussed above, permits the user to add additional, heated manifold components to the initial manifold components to create a customized heated manifold system. Similarly, as shown in FIG. 7, three manifold components 16" can be assembled to provide a heated flowpath from the distribution assembly 40" to the three "drops" or secondary members (not shown) by way of attachment screws 134" engaging the threaded screw cavities 130" of the components 16" and the secondary heated members. Such an embodiment utilizes components which have an angled outlet end 52" and an angled melt runner passage 122".

In yet another important aspect of the present invention, the manifold components or modules 16 are dimensioned to consistently provide the same distance for each melt flowpath extending between the melt distribution assembly 40 and the inlet ends 60 of the secondary heated members 18. In this regard, when the manifold system 10 is assembled, after the manifold components 16 are attached to secondary heated members 18, the components 16 are inserted into the distribution element 40 and aligned with the mold cavity gates 110 such that the raised portions or component standoffs 120 contact the mold block surfaces 124. When this occurs, there is a small gap δ (150) occurs between the outer surface 45 of the distribution element 40 and the end surface 141 of the component enlarged end portion 70. When the system is activated and it reaches its operating temperature, any thermal expansion which takes place within the manifold components 16 occurs inwardly of the system. That is, because the raised portions 120 at the component outer ends engage the mold block surfaces 124, the components will expand inwardly toward the distribution element 42 such that at the maximum thermal expansion of the system, the components 16 abuttingly engage the distribution element outer surfaces 45. Thus, the thermal expansion forces are reversed from their normal manner of occurrence and the attachment between the component 16 and the secondary heated members 18 is substantially relieved of all thermal expansion forces. The manifold components 16 will all tend to grow equally and thus the travel distance for the injected melt in the manifold system is equal for all system legs or drops. Accordingly, the pressure drop for each such leg or drop is equal so that the injection pressure is balanced throughout the system and no single drop receives a greater injection pressure than the others.

It will be appreciated that the embodiments of the present invention which have been discussed are merely illustrative of some of the applications of this invention that numerous modifications may be made by those skilled in the art without departing from the true spirit and scope of this invention.

I claim:

1. An injection molding manifold assembly for heating and conveying liquid melt injected from an injection molding machine into one or more mold cavity gates wherein the manifold assembly provides a heated pathway between the injection molding machine and the one or more cavity gates, the manifold assembly comprising:

a primary heated member, one or more secondary heated members corresponding in number to said one or more mold cavity gates, the primary heated member having a body with a heated internal melt passageway disposed between an inlet end and an outlet end of the body, the inlet end being adapted to engage the injection molding machine and the outlet end engaging means for distributing the injected melt to a plurality of manifold components, each individual manifold component of the plurality of manifold components having an elongated body with a heated internal melt passageway disposed between an inlet end and an outlet end of each said manifold component, each said manifold component inlet end being adapted to engage the melt distribution means and each said manifold outlet end being adapted to engage a respective secondary heated member, each respective secondary heated member having a body extending between an inlet end and an outlet end of said body, the secondary heated member inlet end being adapted to engage said outlet end of a manifold component and the secondary heated member outlet end being adapted to engage a gate of a mold cavity, the elongated body of each said manifold component of said plurality of manifold components having an internal melt passageway generally centrally disposed therein, each manifold component internal melt passageway being adapted to receive pressurized melt at said inlet end thereof and being adapted to discharge said pressurized melt at said outlet end thereof, elongated internal heating means disposed in an elongated annular compartment of each of said manifold components and disposed proximate to said manifold component internal melt passageway, the internal heating means extending substantially along the length of said internal melt passageway and substantially surrounding said internal melt passageway, each of said manifold components having an inner core wall which defines each manifold component internal melt passageway and a manifold component outer wall which defines the outer surface of said manifold component body member, said manifold component inner core and said manifold outer wall defining said annular compartment therebetween, each of said component inner core walls and outer walls being integrally joined together at a manifold component endwall.

2. The injection molding manifold assembly of claim 1, wherein each of said manifold component internal heating means includes an elongated hollow sleeve of a non-electrically conductive material sized to be slidingly received on said manifold component inner core walls in said annular compartment.

3. The injection molding manifold assembly of claim 2, wherein said hollow sleeve is made from an extruded refractory material.

4. The injection molding manifold assembly of claim 1, wherein said internal heating means includes a hollow sleeve which is circumferentially wound with a resistance wire which is adapted to engage a power source.

5. The injection molding manifold assembly of claim 1, wherein each of said manifold component internal heating means includes a resistance heating element wound over a ceramic sleeve, the ceramic sleeve overlying said inner core wall of said manifold component internal melt passageway.

6. The injection molding manifold assembly of claim 1, wherein said internal heating means is disposed in surrounding relationship to said inner core, said internal heating means axially extending a preselected length within and occupying a portion of said annular compartment and a compacted unified mass of particulate material occupying the remainder of said annular compartment, the internal heating means hollow sleeve being made of magnesium oxide and said compacted unified mass of particulate material including magnesium oxide.

7. The injection molding manifold assembly of claim 1, wherein said melt distribution means includes a distribution element having openings therein leading to a central melt distribution chamber thereof, each of said manifold components including means for engaging an opening of said melt distribution element said engaging means including an elongated neck portion of said inner core wall axially extending past an inlet surface of said component member.

8. The injection molding manifold assembly of claim 1, wherein each of the manifold component bodies includes means for resisting injection molding pressure, said pressure resistance means including at least one raised land portion disposed on an exterior surface of each manifold component body and adapted to engage an opposing surface of a mold block.

9. The injection molding manifold assembly of claim 8, wherein said at least one land portion is disposed on the exterior surface of said manifold component proximate to said outlet end.

10. The injection molding manifold assembly of claim 1 wherein each of said manifold components includes means for engaging a surface of a surrounding mold block, said mold block surface engagement means including a generally circular raised portion having a central recess disposed therein, the raised portion being disposed on an end of each manifold component opposite said manifold component inlet end, the raised portion central recess being disposed within said raised portion in general axial alignment with said manifold component internal melt passageway.

11. The injection molding manifold assembly of claim 1, wherein each of said manifold component internal heating means includes a hollow sleeve of non-electrically conductive material which axially extends within said annular compartment and encircles said manifold component elongated inner core, said sleeve being circumferentially wound with a separate resistance wire and being operatively connectable to a power source, said internal heating means further including separate temperature monitoring means operatively associated with said hollow sleeve, whereby heat supplied to one manifold component can be independently controlled and monitored with respect to the other of the manifold components in said injection molding manifold assembly.

12. The injection molding manifold assembly of claim 7, wherein each of said manifold component internal heating means further includes a separate thermowell passage adapted to receive a separate removable thermocouple lead therein for independently monitoring the heat applied by resistance wires in said internal heating means.

13. The injection molding manifold assembly of claim 1, wherein said melt distribution means includes a distribution element having a primary opening adapted to slidingly receive the outlet end of said primary heated member, and a plurality of secondary openings corresponding in number to the number of manifold components of said injection molding manifold assembly, each of the distribution element secondary openings being adapted to slidingly receive said inlet end of a respective manifold component, the distribution element including a hollowed-out portion generally centrally disposed in a support face thereof disposed opposite said distribution element primary opening.

14. The injection molding manifold assembly of claim 1, wherein said respective secondary heated members are sprue bushings.

15. The injection molding manifold assembly of claim 1, wherein said respective secondary heated members are torpedoes.

16. The injection molding manifold assembly of claim 1, wherein each said manifold component includes at least one land portion extending outwardly from the body thereof, the at least one land portion being adapted to abuttingly engage a surface of a mold block, said at least one land portion defining an air gap around the exterior of each manifold component.

17. The injection molding manifold assembly claim 1, wherein each of said manifold components are generally cylindrical.

18. The injection molding manifold assembly claim 1, wherein each of said manifold component outlet ends include a generally solid portion axially extending from said manifold component endwall, each axially extending portion including an internal melt passageway extension angularly disposed with respect to a corresponding manifold component melt passageway.

19. A modular manifold assembly for providing a heated melt flowpath for an injection molding system, the heated melt flowpath extending from between an injection molding machine to one or more gates of individual mold cavities disposed within mold blocks, said assembly comprising, a plurality of internally heated modules, each of the plurality of modules having an integral body portion, each of said module integral body portions including an inner core having an internal melt passageway adapted to convey liquid melt therethrough extending between opposite melt inlet and outlet ends of said modules, each of said module integral body portions having an elongated outer wall encircling said module inner core, each of said module body portion further including a module endwall integrally formed with said module inner core and said module outer wall, each of said modules further having an elongated annular compartment axially extending along said module inner core between said module melt inlet end and said module melt outlet end, the elongated annular compartment being defined by said module inner core, outer wall and endwall, heating means disposed in said annular compartment and disposed in surrounding relation to said elongated inner core, said heating means axially extending a preselected length within and occupying a portion of said annular compartment, a compacted unified mass of particulate material occupying the remainder of said annular compartment, a melt runner passage in said elongated inner core interposed between and in flow communication with said module inlet end and said outlet end.

20. The modular manifold assembly of claim 19, wherein each of said modules includes means disposed at the inlet end thereof for engaging a distribution element and each of said modules further includes means disposed at the outlet end thereof for engaging heated members.

21. The modular manifold assembly of claim 19, wherein each of said modules includes means for supporting said module within a mold block in a manner to resist any pressures imparted to said modular manifold assembly by injection of liquid melt therein, the module supporting means including at least one raised portion extending outwardly from the exterior surface of said module outer wall and having a support surface adapted to abuttingly engage the mold block.

22. The modular manifold assembly of claim 21, wherein said manifold module is generally cylindrical and said manifold module supporting means includes a raised circumferential ring portion.

23. The modular manifold assembly of claim 21, wherein said manifold module supporting means is disposed proximate to said module outlet end and in general axial alignment with said melt runner passage.

24. The modular manifold assembly of claim 19, wherein said heating means includes a ceramic sleeve disposed in said annular compartment, the ceramic sleeve being slidingly received on said elongated inner core of said module.

25. The modular manifold assembly of claim 24, wherein said ceramic sleeve is made from an extruded refractory material.

26. The modular manifold assembly of claim 24, wherein the outer surface of said ceramic sleeve is circumferentially wound with a resistance wire which is an operative communication with a power source.

27. The modular manifold assembly of claim 24, wherein said ceramic sleeve is made of magnesium oxide and said compacted unified mass of particulate material includes magnesium oxide.

28. The modular manifold assembly of claim 24, wherein each module endwall includes an axially extending portion and said module melt outlet end being disposed in said endwall axially extending portion and being angularly disposed with respect to said module melt inlet end.

29. An internally heated injection molding modular manifold component having an inlet for receiving pressurized melt and an outlet for the discharge of the pressurized melt, said manifold component comprising: a unitary component casing-core element having an integral outer sidewall, an endwall and an elongated inner core integrally formed together, an outer surface of said elongated inner core and the inner surface of said sidewall defining a generally annular compartment within said component casing-core element; heating means in surrounding relation to said elongated inner core, said heating means axially extending a preselected length within and occupying a portion of said annular compartment; a compacted unified mass of particulate material occupying the remainder of said annular compartment; a melt runner passage disposed in said elongated inner core interposed between and in melt flow communication with said inlet and outlet of said manifold component; said elongated inner core extending between said inlet and outlet of said manifold component in a manner such that no welded joints are present in the melt runner passage, said manifold component inlet end including means for engaging an internal melt distribution chamber of a melt distribution assembly, and said manifold casing-core element further including means for providing an air gap between the outer sidewall of said manifold component and an adjoining surface of a mold block.

30. The manifold component of claim 29, wherein said manifold component outer sidewall includes a generally cylindrical portion extending between said respective inlet and outlet ends, the sidewall cylindrical portion being joined to an endcap at one end thereof, the endcap closing off said annular compartment.

31. The manifold component of claim 29, wherein said heating means includes a hollow sleeve of a non-electrically conductive material sized to be slidingly received on said elongated inner core.

32. The manifold component of claim 29, wherein the outer surface of said hollow sleeve is circumferentially wound with a resistance wire which is in operative communication with a power source.

33. The manifold component of claim 29, wherein said hollow sleeve is made of magnesium oxide and said compacted unified mass of particulate material includes magnesium oxide.

34. The manifold component of claim 29, further including means for supporting said manifold component within said mold block and for resisting injection molding pressures, said supporting and resisting means including a raised portion extending outwardly from said manifold component, said raised portion having a support surface adapted to contact a mold block surface, said raised portion being disposed in general axial alignment with said manifold component melt runner passage.

35. The manifold component of claim 29, wherein said manifold component further includes an extension portion of said endwall disposed proximate to said outlet, a portion of said melt runner passage extending through said endwall extension portion at an angle whereby said manifold component outlet is angularly disposed from said manifold component inlet end.

36. A manifold assembly for providing a heated melt flowpath in an injection molding system which melt flowpath extends from between an injection molding machine to one or more individual mold cavities disposed within one or more mold blocks, the manifold assembly comprising in combination, means for distributing melt injected from the injection molding machine to the one or more mold cavities, a plurality of internally heated manifold components, each of the manifold components being adapted to engage the melt distribution means, each of said manifold components having an internal melt passageway disposed between an inlet end and an outlet end thereof, each of said manifold components having an elongated, generally cylindrical body extending between said inlet and outlet ends thereof, each manifold component generally cylindrical body having said internal melt passageway disposed within an elongated inner core of said manifold component body, the inner core extending axially between said inlet ends and outlets thereof, each of said manifold components further having an elongated outer wall encircling said manifold component inner core, the manifold component outer wall, said manifold component inner core and a manifold component endwall being integrally formed together to thereby define an elongated annular compartment between said manifold component inner core and said manifold component outer wall, said manifold component endwall including an axially extending portion, an elongated internal heating means disposed in said annular compartment proximate to and substantially surrounding a portion of said internal melt passageway and further occupying a portion of said annular compartment, said manifold component axially extending portion including a delivery portion of said internal melt passageway, said internal melt passageway delivery portion being disposed angularly apart from said manifold component inlet end, the remainder of said annular compartment further including a compacted unified mass of particulate material surrounding both said inner core and said elongated heating means, said melt distribution means including a distribution element having a primary opening adapted to receive the outlet end of a primary heated member and one or more secondary openings adapted to receive therein respective inlet ends of said manifold components, each of the manifold components having one or more raised portions disposed on an exterior surface of each said manifold component body, the one or more raised portions providing a support surface for resisting thermal expansion of said manifold component and for resisting injection molding pressures encountered by each of said manifold components.

37. The manifold assembly of claim 36, wherein each of the manifold components includes at least one raised portion disposed on an exterior surface thereof, the at least one raised portion providing a support surface for resisting thermal expansion and for resisting injection molding pressures encountered by each of said manifold components.

38. The manifold assembly of claim 37, wherein said manifold component endwall extending portion includes two internal melt passageway delivery portions, said internal melt passageway delivery portions being angularly displaced within said manifold component endwall extending portion with respect to said internal melt passageway.

39. A manifold assembly for conveying injection molded plastic melt into a mold from an injection molding machine, through a manifold, the assembly comprising at least two internally heated manifold components, each of the manifold components having a unitary construction in which a manifold component outer sidewall, an endwall and an inner core thereof are integrally formed together and define an annular compartment surrounding a central melt passageway, the central melt passageway being disposed in said inner core, each of the annular compartments further including an electric heating means completely disposed therein, each of said manifold components further having an inlet end with a neck portion associated therewith, each of said manifold component neck portions being adapted to slidingly engage a recess disposed at an outlet end of a manifold component.

40. The manifold assembly of claim 39, wherein at least one of said manifold components including means for resisting thermal expansion and injection pressure forces, said force resistance means including means for contacting an opposing surface of a mold block.

* * * * *